US012752830B2

(12) United States Patent
Geiser

(10) Patent No.: US 12,752,830 B2
(45) Date of Patent: Oct. 6, 2026

(54) MOUNTABLE ASSEMBLY FOR A STEERING WHEEL

(71) Applicant: Geiser, Inc., Phoenix, AZ (US)

(72) Inventor: Sean Geiser, Phoenix, AZ (US)

(73) Assignee: UPFIT UTV, INC., Phoenix, AZ (US)

( * ) Notice: Subject to any disclaimer, the term of this patent is extended or adjusted under 35 U.S.C. 154(b) by 0 days.

(21) Appl. No.: 18/493,291

(22) Filed: Oct. 24, 2023

(65) Prior Publication Data

US 2025/0128751 A1 Apr. 24, 2025

(51) Int. Cl.
*B62D 1/04* (2006.01)

(52) U.S. Cl.
CPC .................................... *B62D 1/046* (2013.01)

(58) Field of Classification Search
CPC ..... B62D 1/00–1/286; B60K 2360/583; B60K 2360/586; B60K 2360/782; B60K 35/10; B60K 35/50; B60K 35/60
USPC ............................................................ 701/36
See application file for complete search history.

(56) References Cited

U.S. PATENT DOCUMENTS

| | | | | |
|---|---|---|---|---|
| 9,436,182 | B2 * | 9/2016 | Nemec | G05D 1/0016 |
| 9,802,638 | B1 * | 10/2017 | Stoffel | B62D 1/22 |
| 10,486,532 | B2 * | 11/2019 | Chapman | B60K 35/10 |
| 10,857,884 | B2 * | 12/2020 | Derrick | B62D 1/105 |
| 12,157,411 | B1 * | 12/2024 | Zhou | B62D 1/046 |
| 2006/0284839 | A1 * | 12/2006 | Breed | B60W 50/16 345/156 |
| 2012/0283914 | A1 * | 11/2012 | Karwaczynski | B60K 35/10 701/41 |
| 2014/0371987 | A1 * | 12/2014 | Van Wiemeersch | B62D 1/046 701/41 |
| 2016/0001807 | A1 * | 1/2016 | Hans | B62D 1/046 74/484 R |
| 2016/0377508 | A1 * | 12/2016 | Perrone | G01M 17/06 180/204 |
| 2017/0072984 | A1 * | 3/2017 | Gong | B60K 35/80 |
| 2018/0118131 | A1 * | 5/2018 | Lowell | B60R 11/0241 |
| 2019/0071112 | A1 * | 3/2019 | Toddenroth | B60R 21/2032 |
| 2019/0073111 | A1 * | 3/2019 | Luchner | G06F 3/0482 |
| 2020/0348771 | A1 * | 11/2020 | Clochard | B60K 35/10 |
| 2021/0121787 | A1 * | 4/2021 | Nelson | B60R 11/04 |
| 2021/0229603 | A1 * | 7/2021 | Daly, Jr. | B60R 11/0264 |
| 2021/0258752 | A1 * | 8/2021 | Burkin, Jr. | B60K 35/10 |
| 2023/0242047 | A1 * | 8/2023 | Daly, Jr. | G06F 3/0488 701/36 |

(Continued)

*Primary Examiner* — Mohamed Abdo Algehaim
(74) *Attorney, Agent, or Firm* — Schmeiser Olsen PLLC

(57) ABSTRACT

The disclosed mountable assembly for a steering wheel of an off-road vehicle according to various aspects of the subject invention may include a plate configured to be attached to the steering wheel and a plurality of user-operated buttons mounted on the plate, each user-operated button further comprising a corresponding mount. The mountable assembly may also include a housing for enclosing an emulating module. The emulating module may be configured to receive and decode Controller Area Network (CAN) signals from electronic control units of the vehicle through a CAN wire harness. The emulating module may be further configured to convert the CAN signals to control signals for the plurality of user-operated buttons such that the user-operated buttons emulate functions of a plurality of factory-installed buttons of the steering wheel.

6 Claims, 5 Drawing Sheets

(56) References Cited

U.S. PATENT DOCUMENTS

2025/0027560 A1* 1/2025 Geiser .................. F16H 59/105
2025/0033476 A1* 1/2025 Pirkey .................. B60K 35/10

* cited by examiner

MOUNTABLE ASSEMBLY FOR A STEERING WHEEL

BACKGROUND OF THE INVENTION

State of the art

Off-road vehicles, such as all-terrain vehicles (ATVs), utility task vehicles (UTV), and similar vehicles, have become integral tools for various applications, from recreational off-roading to industrial and agricultural tasks. Central to their evolving capabilities are the electronic control systems that manage a wide array of vehicle functions. Among these controls, factory-installed buttons on the vehicle's steering wheel play a pivotal role, enabling users to access and manage critical functions such as lighting, winches, and auxiliary equipment. However, as vehicle enthusiasts seek to personalize their riding experiences or adapt vehicles for specific tasks, a growing demand has emerged for the ability to integrate additional controls seamlessly. This demand has driven the development of an innovative solution, one that allows users to mount a customizable control panel directly onto the steering wheel, thereby emulating the functions of factory-installed buttons.

While the desire for increased control and customization in the operation of off-road vehicles is evident, traditional solutions have posed several challenges. Existing systems often require complex modifications or rewiring of the vehicle's electronic systems, which can be time-consuming and technically demanding. Furthermore, these modifications may void warranties and introduce potential safety concerns.

Accordingly, there is a need for an innovative and user-friendly solution that enables the seamless integration of customizable control panels onto the steering wheels of off-road vehicles that emulates factory button functions and also provides real-time feedback and customization options without the complexities and drawbacks associated with conventional modification methods.

SUMMARY OF THE INVENTION

The disclosed mountable assembly for a steering wheel of an off-road vehicle, such as ATVs, UTVs and similar vehicles, according to various aspects of the subject invention may comprise a plate configured to be attached to the steering wheel and at least one user-operated button mounted on the plate, each user-operated button further comprising a corresponding mount. The mountable assembly may also comprise a housing for enclosing an emulating module. The emulating module may be configured to receive and decode Controller Area Network (CAN) signals from electronic control units of the vehicle through a CAN wire harness. The emulating module may be further configured to convert the CAN signals to control signals for the at least one user-operated button wherein the at least one user-operated button emulates functions of at least one factory-installed button of the steering wheel.

The at least one user-operated button may be a plurality of user-operated buttons and wherein the at least one factory-installed button may be a plurality of factory-installed buttons. The corresponding mount on the plate may be configured for attaching the at least one user-operated button to the plate. The plurality of user-operated buttons may be momentary buttons. The plate may be configured to be securely attached to the steering wheel using a plurality of holes located at a center of the plate and a plurality of fasteners. A display screen may be connected to the emulating module for providing visual feedback of button functions of the at least one user-operated button. A control circuit may be coupled to the emulating module for processing and translating the CAN signals. The housing may further enclose the control circuit. The housing may comprise an opening located at a center of the housing, wherein the opening is configured to receive the CAN wire harness therethrough, and wherein the CAN wire harness connects to the control circuit. The housing may comprise a corner hole at each corner of the housing, each of the corner holes extending outwards from the housing; and two side holes, one on each side of the housing, for mounting a cover to the housing.

The disclosed method for emulating factory-installed button functions of a vehicle according to various aspects of the subject invention may comprise attaching a plate to a steering wheel of the vehicle, the plate comprising at least one user-operated button with corresponding mounts, and an emulating module; receiving Controller Area Network (CAN) signals from electronic control units of the vehicle by the emulating module; converting the CAN signals to control signals for the at least one user-operated button by the emulating module; and activating the at least one user-operated button, whereby the at least one user-operated button emulates the factory installed button functions of the vehicle.

The at least one user-operated button may be a plurality of user-operated buttons. The method may further comprise displaying visual feedback of button functions of the at least one user-operated button on a display screen connected to the emulating module. The plate may be securely attached to the steering wheel using a plurality of holes located at the center of the plate and a plurality of fasteners. The emulating module may comprise a memory module for storing user preferences and custom button configurations of the at least one user-operated button. The method may further comprise a step of customizing functions of the at least one user-operated button through a user interface provided on a display screen. The method may further comprise a step of calibrating the emulating module to adapt to variations in CAN signal output from different vehicle models.

BRIEF DESCRIPTION OF THE DRAWINGS

A more complete understanding of the subject invention may be derived by referring to the detailed description when considered in connection with the following illustrative figures. In the following figures, like reference numerals refer to similar elements and steps throughout the figures.

DETAILED DESCRIPTION OF EMBODIMENTS

The subject invention may be described in terms of functional components. Such functional components may be realized by any number of components configured to perform the specified functions and achieve the various results. For example, the subject invention may employ various coupling components, fasteners, housings, plates, mounts, emulating modules, microcontrollers, and the like, which may carry out a variety of functions. In addition, the subject invention may be practiced in conjunction with any one of various vehicle steering wheels, and the mountable assembly described herein is merely one exemplary application for the invention. For the purposes of this application, the term "vehicle" means any suitable off-road vehicle, such as an all-terrain vehicle (ATV), a utility task vehicle (UTV), and the like.

Figure 1:
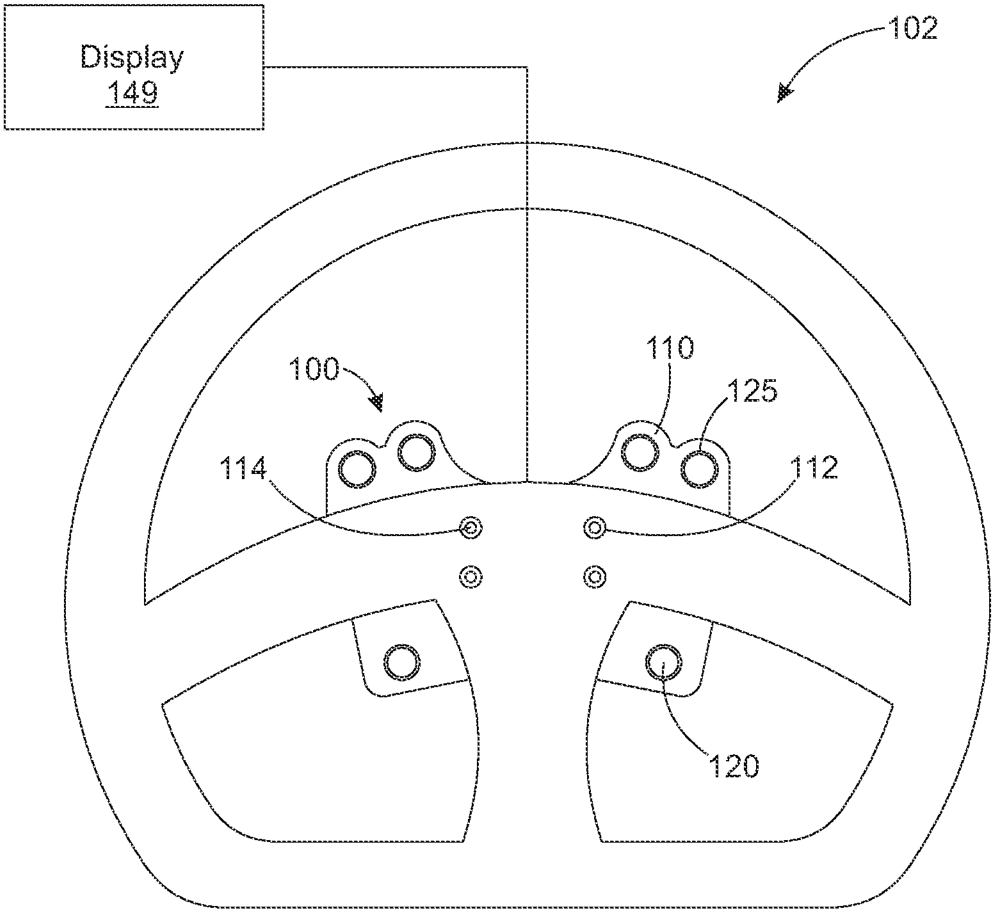
FIG. 1 representatively illustrates a front view of a plate and user-operated buttons of a mountable assembly installed on a steering wheel in accordance with an embodiment of the subject invention.
Figure 2:
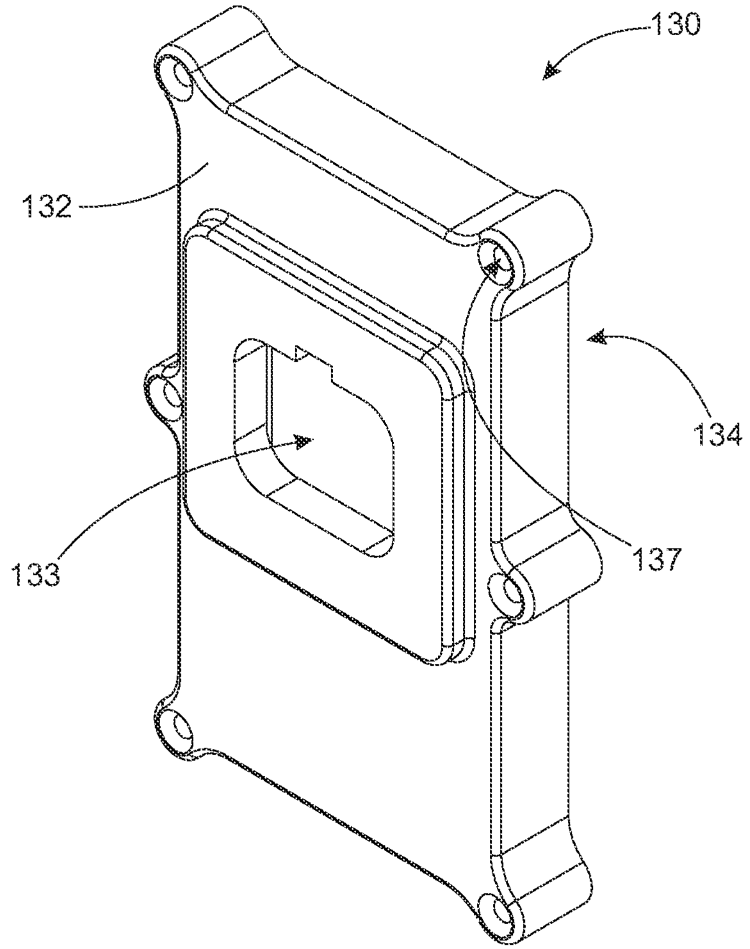
FIG. 2 representatively illustrates a perspective view of a housing of a mountable assembly for a steering wheel in accordance with an embodiment of the subject invention.
Figure 3:
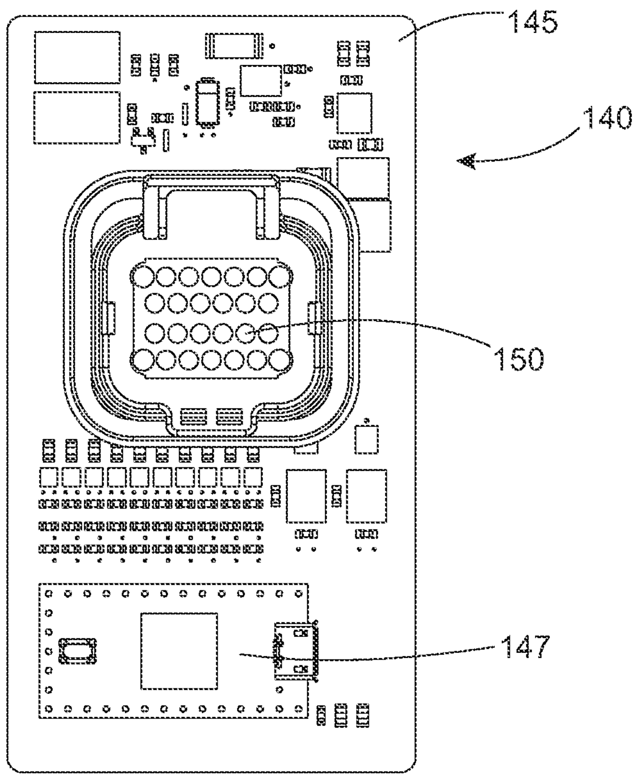
FIG. 3 representatively illustrates a front view of a circuit board of a mountable assembly for a steering wheel in accordance with an embodiment of the subject invention.
Figure 4:
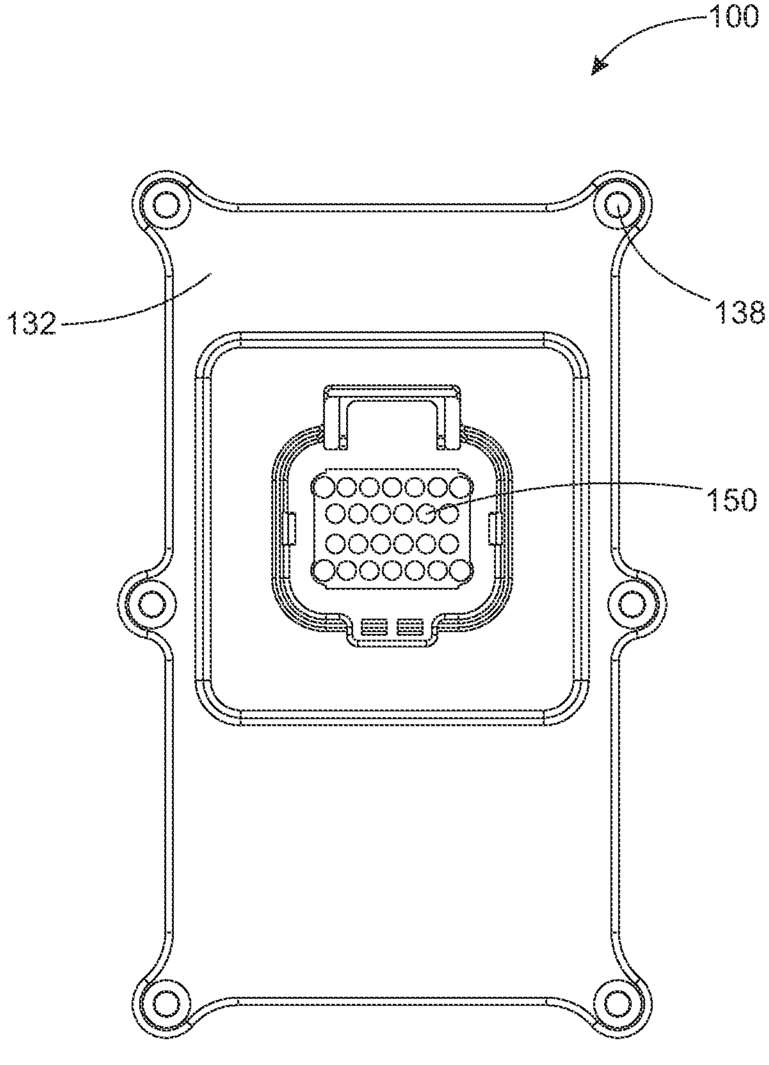
FIG. 4 representatively illustrates a front view of the housing shown in FIG. 2, with the circuit board shown in FIG. 3 housed therein in accordance with an embodiment of the subject invention.
Figure 5:
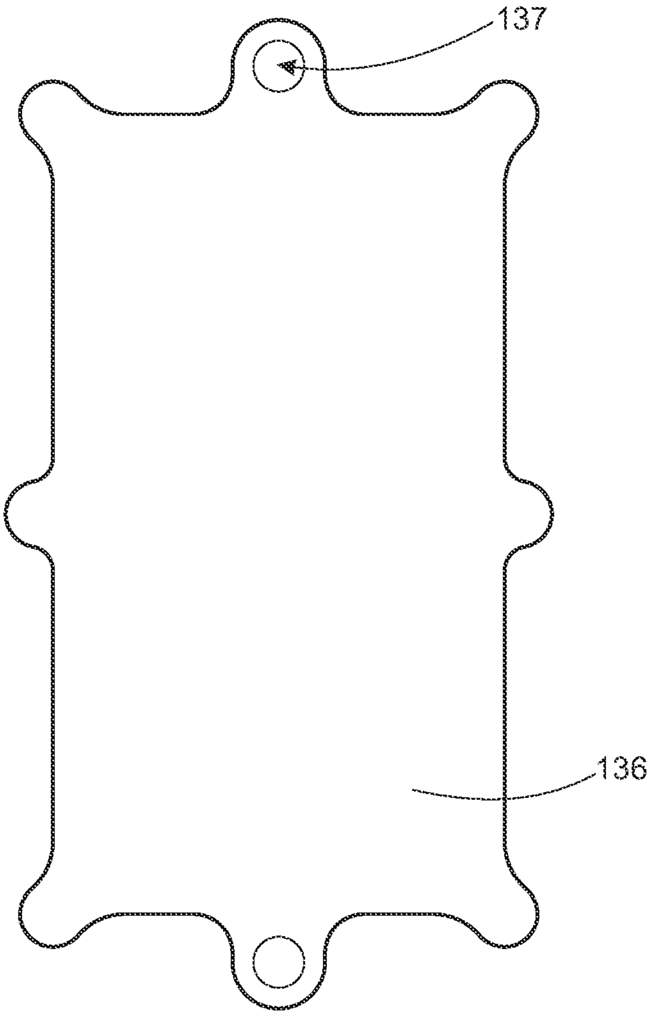
FIG. 5 representatively illustrates a rear view of a housing of a mountable assembly for a steering wheel in accordance with an embodiment of the subject invention.

Referring to FIGS. 1-5, a mountable assembly 100 for a steering wheel 102 of an off-road vehicle may comprise a plate 110. Attached to the plate 110 is at least one user-operated button, such as a plurality of user-operated buttons 120, with each user-operated button 120 equipped with a corresponding mount 125 for secure attachment to the plate 110. The mountable assembly 100 may also comprise a housing 130 comprising an emulating module 140 that may be configured to interact or communicate with electronic control units (not shown) of the vehicle, receiving and decoding Controller Area Network (CAN) signals transmitted via a CAN wire harness 150 and subsequently converting the CAN signals into control signals that govern the operation of the plurality of user-operated buttons 120, effectively emulating the functions of at least one factory-installed button, such as a plurality of factory-installed buttons (not shown) on the steering wheel 102.

The plate 110 may provide a secure and stable means of attaching the plurality of user-operated buttons 120 to the steering wheel 102 of the vehicle. The plate 110 may comprise a plurality of strategically placed attachment points on the plate 110 for providing a secure and firm connection between the plate 110 and the steering wheel 102. For example, the plate 110 may be securely attached to the steering wheel 102 using holes or apertures 112 located in the center of the plate 110, and fasteners 114, such as screws or similar fasteners, ensuring a robust and stable connection, even during challenging off-road conditions and vehicle operation. Additionally, each user-operated button 120 may have a corresponding mount 125. Each mount 125 may provide a secure attachment of the user-operated buttons 120 to the mounting plate 110. The plurality of user-operated buttons 120 may comprise momentary buttons for providing precise control, momentary activation, or tactile feedback. Further, the plurality of user-operated buttons 120 may be in various shapes, sizes, and configurations to suit different purposes.

The housing 130 may protect the internal components and provides user-friendly access for installation and maintenance. Various components that collectively contribute to the functionality of the mountable assembly 100 may be positioned and securely contained within the housing 130. Within this housing, the emulating module 140 may be connected to the control circuit 145. The housing 130 may comprise a first side 132 and an open second side 134, which can be securely enclosed with a purpose-designed cover 136. The cover 136 may be fastened to the housing 130 through strategically positioned holes 137 and fasteners 138. To facilitate attachment, the housing 130 may comprise four apertures, positioned at each corner, extending outward, along with two additional apertures located along the sides. Moreover, the first side 132 of the housing 130 may comprise an opening 133, configured to accommodate and provide a user or operator with access to the CAN wire harness 150.

The emulating module 140 may connect the vehicle's electronic control systems or units and the user-operated buttons 120 to enable precise and responsive control while replicating the familiar functionalities of the factory-installed buttons. The emulating module 140 may be integrated onto a control circuit 145 contained within the housing 130. By containing the emulating module 140 and control circuit 145 within the housing 130, the mountable assembly 100 may optimize space utilization and simplify installation, offering users a more cohesive and user-friendly experience when customizing and operating their off-road vehicles.

The emulating module 140 may be configured to receive and decode various Controller Area Network (CAN) signals that are transmitted by the electronic control units of the vehicle. This communication may be facilitated through the CAN wire harness 150, enabling the emulating module 140 to establish a connection with the vehicle's electronic control units. Once the CAN signals are received by the emulating module 140, the emulating module 140 may be configured to convert the CAN signals into control signals specifically tailored or customized to the user-operated buttons 120 affixed to the plate 110, such that the user-operated buttons 120 may emulate the functions of the factory-installed buttons on the steering wheel 102. The emulating module 140 may be implemented using a variety of different logic components, processors, associated configuration data and/or stored programming instructions.

In operation, as depicted in FIGS. 1-5, the method for emulating the functions of factory-installed buttons on an off-road vehicle involves several steps. Initially, the method may comprise securely attaching the plate 110, which may be rectangular shaped, to the vehicle's steering wheel 102 using the using holes or apertures 112 located at the center of the plate 110, and fasteners 114, such as screws or similar fasteners, ensuring a robust and stable connection. The plate 110 may be equipped with the series of user-operated buttons 120, which include momentary buttons.

Contained within the housing 130 is the emulating module 140 and control circuit 145 which operate together to receive and process Controller Area Network (CAN) signals transmitted from the vehicle's electronic control units. The emulating module 140 may be further equipped with a memory module 147, which serves to store user preferences and custom button configurations. The mountable assembly 100 may be connected to a user interface provided on a display screen 149. The display screen 149 may provide valuable visual feedback regarding the executed button functions, such as providing the operator with information about the selected functions. Additionally, the interface may allow the operator to customize the functions of the user-operated buttons 120, offering a tailored experience to suit individual preferences.

The method may further comprise performing a calibration step, enabling the emulating module 140 to adapt to variations in CAN signal output across different vehicle models, thereby ensuring consistent and reliable performance across a range of vehicles.

Specifically, the emulating module 140 may convert the CAN signals to control signals that then may customized to the plurality of user-operated buttons 120 attached to the plate 110. After the user-operated buttons are activated, they may effectively replicate the functions of the factory-installed buttons on the steering wheel 102 of the vehicle.

The particular implementations shown and described are illustrative of the invention and its best mode and are not intended to otherwise limit the scope of the subject invention in any way. Indeed, for the sake of brevity, conventional manufacturing, connection, preparation, and other functional aspects of the apparatus may not be described in detail. Furthermore, the connections and points of contact shown in the various figures are intended to represent exemplary physical relationships between the various elements. Many alternative or additional functional relationships or physical connections may be present in a practical system.

In the foregoing description, the invention has been described with reference to specific exemplary embodiments. Various modifications and changes may be made, however, without departing from the scope of the subject invention as set forth. The description and figures are to be regarded in an illustrative manner, rather than a restrictive one and all such modifications are intended to be included within the scope of the subject invention. Accordingly, the scope of the invention should be determined by the generic embodiments described and their legal equivalents rather than by merely the specific examples described above. For example, the components and/or elements recited in any apparatus embodiment may be combined in a variety of permutations to produce substantially the same result as the subject invention and are accordingly not limited to the specific configuration recited in the specific examples.

Benefits, other advantages, and solutions to problems have been described above with regard to particular embodiments. Any benefit, advantage, solution to problems or any element that may cause any particular benefit, advantage, or solution to occur or to become more pronounced, however, is not to be construed as a critical, required, or essential feature or component.

The terms "comprises." "comprising." or any variation thereof, are intended to reference a non-exclusive inclusion, such that a process, method, article, composition, or apparatus that comprises a list of elements does not include only those elements recited but may also include other elements not expressly listed or inherent to such process, method, article, composition, or apparatus. Other combinations and/or modifications of the above-described structures, arrangements, applications, proportions, elements, materials, or components used in the practice of the subject invention, in addition to those not specifically recited, may be varied, or otherwise particularly adapted to specific environments, manufacturing specifications, design parameters or other operating requirements without departing from the general principles of the same.

The subject invention has been described above with reference to an exemplary embodiment. However, changes and modifications may be made to the exemplary embodiment without departing from the scope of the subject invention. These and other changes or modifications are intended to be included within the scope of the subject invention.

The invention claimed is:

1. A method for emulating factory-installed button functions of a vehicle, comprising:

attaching a plate to a steering wheel of the vehicle, the plate comprising a plurality of user-operated buttons with corresponding mounts, and a housing containing an emulating module and a control circuit coupled to the emulating module, wherein the plate is attached to a rim or spoke of the steering wheel and comprises a plurality of attachment points for secure connection to the steering wheel, and wherein each of the plurality of user-operated buttons comprises a momentary button providing tactile feedback, wherein the emulating module comprises a memory module for storing user preferences and custom button configurations of the plurality of user-operated buttons;

customizing functions of the plurality of user-operated buttons associating each of the plurality of user-operated buttons with a function of one factory installed button and storing identical user preferences and custom button configurations on the memory module of the emulating module;

receiving Controller Area Network (CAN) signals from electronic control units of the vehicle by the emulating module;

converting the CAN signals to control signals for the plurality of user-operated buttons by the emulating module to process and translate the CAN signals; and activating the plurality of user-operated buttons, whereby the plurality of user-operated buttons emulate the factory installed button functions of the vehicle.

2. The method of claim 1, further comprising displaying visual feedback of button functions of the plurality of user-operated buttons on a display screen connected to the emulating module.

3. The method of claim 2, wherein customizing functions of the plurality of user-operated buttons further comprises customizing functions of the plurality of user-operated buttons through a user interface provided on a display screen.

4. The method of claim 2, further comprising a step of calibrating the emulating module to adapt to variations in CAN signal output from different vehicle models.

5. The method of claim 1, wherein the plate is securely attached to the steering wheel using a plurality of holes located at a center of the plate and a plurality of fasteners.

6. The method of claim 1, wherein the vehicle is an off-road vehicle.

* * * * *